United States Patent
Damnjanovic

(10) Patent No.: US 8,509,791 B2
(45) Date of Patent: Aug. 13, 2013

(54) HANDOVER IN WIRELESS COMMUNICATIONS

(75) Inventor: Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1130 days.

(21) Appl. No.: 12/049,208

(22) Filed: Mar. 14, 2008

(65) Prior Publication Data

US 2008/0227454 A1  Sep. 18, 2008

Related U.S. Application Data

(60) Provisional application No. 60/895,453, filed on Mar. 17, 2007.

(51) Int. Cl.
  *H04W 72/00* (2009.01)
  *H04W 36/00* (2009.01)
(52) U.S. Cl.
  USPC .......................................... 455/450; 455/436
(58) Field of Classification Search
  USPC ........................... 455/450, 436–444; 370/331
  See application file for complete search history.

(56) References Cited

U.S. PATENT DOCUMENTS

| | | | |
|---|---|---|---|
| 2005/0286465 A1* | 12/2005 | Zhuang | 370/329 |
| 2006/0270406 A1* | 11/2006 | Kim | 455/436 |
| 2006/0276191 A1* | 12/2006 | Hwang et al. | 455/436 |

FOREIGN PATENT DOCUMENTS

| | | |
|---|---|---|
| EP | 1232611 A1 | 8/2002 |
| EP | 1469697 | 10/2004 |
| KR | 100651621 | 11/2006 |
| KR | 20060116901 A | 11/2006 |
| RU | 2137314 C1 | 9/1999 |
| WO | 0135586 | 5/2001 |
| WO | WO 01/35586 * | 5/2001 |
| WO | WO2006088398 A1 | 8/2006 |

OTHER PUBLICATIONS

"IP Wireless: ""Contention-free Intra-LTE handover""", 3GPP Draft; R2-070646, 3rd Generation Partnership Project (3GPP), Mobile , Competence Centre ; 650, Route Des Lucioles ; F-06921 Sophia-Antipolis Cedex ; France,vol. tsg ran\WG2_RL2\TSGR2_ 57\Documents, No. St. Louis, USA: Feb. 12, 2007, Feb. 7, 2007, XP050133690".

(Continued)

*Primary Examiner* — Michael Faragalla
(74) *Attorney, Agent, or Firm* — Liem T. Do

(57) ABSTRACT

Systems and methodologies are described that facilitate handing over mobile device communications in a wireless network from a source base station to a target base station without using a random access channel (RACH). In this regard, the source base station can request shared data bandwidth resources from the target base station on behalf of the mobile device and assign the resources to the mobile device. The mobile device can calculate a timing difference between the source and target base stations and can handover communications by transmitting over the shared data bandwidth using the timing difference to generally provide correct timing for the transmission. To this end, the target base station can have transmission time intervals where it allows transmitting with an extended cyclic prefix to ensure more reliable handover for the mobile device.

33 Claims, 11 Drawing Sheets

(56) References Cited

OTHER PUBLICATIONS

"NTT Docomo et al. ""Contention vs. Non-contention based Handover""3GPP Draft; R2-063390, 3rd Generation Partnership Project (3GPP), Mobile Competence Centre ; 650, Route Deslucioles, F-06921 Sophia Antipolis Cedex; France, vol. tsg_ran\WG2_RL2\TSGR2_56\Documents) No. Riga, Latvia; Nov. 6, 2006, Nov. 1, 2006. XP050132663".

"Fujitsu: ""Less-contention-based handover"" 3GPP Draft; R2-063325, 3rd Generation Partnership Project (3GPP), MobileCompetence Centre ; 650, Route Des Lucioles ; F-06921 Sophia-Antipolis Cedex; France, vol. tsg_ran\WG2_RL2\TSGR2_56\Documents, No. Riga, Latvia; Nov. 6, 2006, Nov. 1, 2006, XP050132808".

"Fujitsu: ""Less-contention-based handover"" 3GPP Draft; R2-063461, 3rd Generation Partnership Project (3GPP), MobileCompetence Centre ; 650, Route Des Lucioles ; F-06921 Sophia-Antipolis Cedex; France, vol. tsg_ran\WG2_RL2\TSGR2_56\Documents, No. Riga, Latvia; Nov. 6, 2006, Nov. 7, 2006, XP050132939".

"NEC, ""Resource allocations in target cell after Handover""3GPP Draft; R2-070656, 3rd Generation Partnership Project (3GPP), Mobile Competence Centre , 650, Route Deslucioles ; F-06921 Sophia-Antipolis Cedex; France, vol. tsg_ran\WG2 RL2\TSGR2 57\Documents, No. St. Louis, USA: Feb. 12, 2007, Feb. 6, 2007, XP050133699".

"""Backward handover preparation""3GPP Draft; R2-070171Discussion on Backward Handover, 3rd Generation Partnership Project (3GPP), Mobile Competence Centre ; 650, Route Deslucioles ; F-06921 Sophia Antipolis Cedex : France, vol. tsg_ran\WG2_RL2\TSGR2_56bis\Documents, No. Sorrento, Italy ; Jan. 15, 2007, Jan. 9, 2007, XP050133276.

"Texas Instruments Inc.""Optimized HO method for reduced latencies in UL synchronization and initial UL allocation in E-UTRA"3GPP Draft;R2-070702_Optimized_Method for_Reducing_Handover_Latencies T 3rd Generation Partnership Project (3GPP), Mobile Compentence Centre : 650, Route Des Lucioles : F-06921 Sophia Antipolis Cedex; France, vol. tsg_ran\W62_RL2\TSGR2_57\Documents, No. St. Louis, USA; Feb. 12, 2007, Feb. 7, 2007.

"Nokia: ""Non-contention based handover execution""3GPP Draft; R2-063082 Non Contention HO, 3rd Generation Partnership Project (3GPP),Mobile Compentence Centre ; 650, Route Des Lucioles : F-06921 Sophia-Antipolis Cedex : France,vol. tsg_ran\WG2_RL2\TSGR2_56\Documents,No. Riga, Latvia; Nov. 6, 2006, Oct. 31, 2006., XP050132591".

"Nokia: ""Non-contention based handover execution""3GPP Draft; R2-061848 HO Execution, 3rd Generation Partnership Project (3GPP),Mobile Compentence Centre ; 650, Route Des Lucioles : F-06921 Sophia-Antipolis Cedex : France,vol. tsg_ran\WG2_RL2\TSGR2_AHs\2006_06_LTE\Docs, No. Cannes, France; Jun. 27, 2006, Jun. 22, 2006, XP050141885".

International Search Report—PCT/US2008/057290, International Search Authority—European Patent Office—Dec. 12, 2008.

Written Opinion—PCT/US2008/057290, International Search Authority—European Patent Office—Dec. 12, 2008.

Taiwan Search Report—TW097109406—TIPO—Jan. 11, 2012.

\* cited by examiner

HANDOVER IN WIRELESS COMMUNICATIONS

CROSS-REFERENCE TO RELATED APPLICATIONS

This application claims the benefit of U.S. Provisional Patent application Ser. No. 60/895,453 entitled "HANDOVER WITHOUT RACH" which was filed Mar. 17, 2007. The entirety of the aforementioned application is herein incorporated by reference.

BACKGROUND

I. Field

The following description relates generally to wireless communications, and more particularly to handover in wireless communications networks.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennae can relate to both base stations and mobile devices, in one example, allowing bi-directional communication between the devices on the wireless network. As mobile devices move throughout service areas, communication for the devices can be handed over between one or more base stations. For examples where an available base station can offer a better signal or service than a base station currently communicating with the mobile device, the device can be handed over to the available base station. This is typically accomplished by using a random access channel (RACH) to request and schedule resources; however, the RACH can become over-utilized in active communications networks.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating handing-over communications in a wireless communications network utilizing shared data portions of bandwidth related to a target device instead of a random access portion. Using the shared data portion allows handover to a target device without the need for a separate random access portion; thus, the handover procedures can be optimized, and random access portions of bandwidth can be less subject to overloading.

According to related aspects, a method for handing over communications in a wireless network is provided. The method includes providing wireless network communication services to at least one mobile device in a sector. The method additionally can include requesting shared data uplink communication channel resources from at least one base station of a disparate sector on behalf of the mobile device to facilitate handing over the mobile device to the base station and assigning the shared data uplink communication channel resources from the at least one base station of the disparate sector to the mobile device.

Another aspect relates to a wireless communications apparatus. The wireless communications apparatus can include at least one processor configured to, request uplink communications resources from a base station of a disparate sector based at least in part on a measurement report received from a mobile device. The wireless communications apparatus can also include a memory coupled to the at least one processor.

Yet another aspect relates to a wireless communications apparatus that requests uplink resources for handing over mobile device communications. The wireless communications apparatus can include requests uplink resources for handing over mobile device communications and means for receiving the uplink communication resources from the disparate wireless communications apparatus. The wireless communications apparatus can further include means for facilitating utilization of the uplink communication resources by the mobile device.

Still another aspect relates to a computer program product, which can have a computer-readable medium including code for causing at least one computer to provide wireless network communication services to at least one mobile device in a sector. The computer-readable medium can further comprise code for causing the at least one computer to request shared data uplink communication channel resources from at least one base station of a disparate sector on behalf of the mobile device to facilitate handing over the mobile device to the base station. Moreover, the computer-readable medium can include code for causing the at least one computer to assign the shared data uplink communication channel resources from the at least one base station of the disparate sector to the mobile device.

In accordance with another aspect, an apparatus in a wireless communication system can include a processor configured to request uplink communication resources from a disparate wireless communications apparatus for a mobile device, receive the uplink communication resources from the disparate wireless communications apparatus, and facilitate utilization of the uplink communication resource by the mobile device. Also, the apparatus can include a memory coupled to the processor.

According to a further aspect, a method for requesting handing over communications in a wireless network is provided. The method can comprise transmitting a measurement report related to at least one available base station. The method can also comprise receiving shared data channel resources related to at least one of the at least one base station relating to the measurement report and transmitting initial handover data over the shared data channel resources.

Another aspect relates to a wireless communications apparatus. The wireless communications apparatus can include at least one processor configured to handover communications from a source base station to a target base station by transmitting initial handover data on a shared data channel of the target base station. The wireless communications apparatus can also include a memory coupled to the at least one processor.

Yet another aspect relates to a wireless communications apparatus for requesting communication handover in a wireless network. The wireless communications apparatus can comprise means for transmitting initial handover data using an extended cyclic prefix over a shared data channel related to a target base station, means for receiving timing information related to synchronization with the shared data channel, and means for transmitting subsequent communication data using a standard cyclic prefix over the shared data channel.

Still another aspect relates to a computer program product, which can have a computer-readable medium including code for causing at least one computer to transmit a measurement report related to at least one available base station. The computer-readable medium can also include code for causing the at least one computer to receive shared data channel resources related to at least one of the at least one base station relating to the measurement report. Furthermore, the computer-readable medium can comprise code for causing the at least one computer to transmit initial handover data over the shared data channel resources.

In accordance with another aspect, an apparatus can be provided in a wireless communication system including a processor configured to transmit initial handover data using an extended cyclic prefix over a shared data channel related to a target base station, receive timing information related to synchronization with the shared data channel, and transmit subsequent communication data using a standard cyclic prefix over the shared data channel. Additionally, the apparatus can comprise a memory coupled to the processor.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
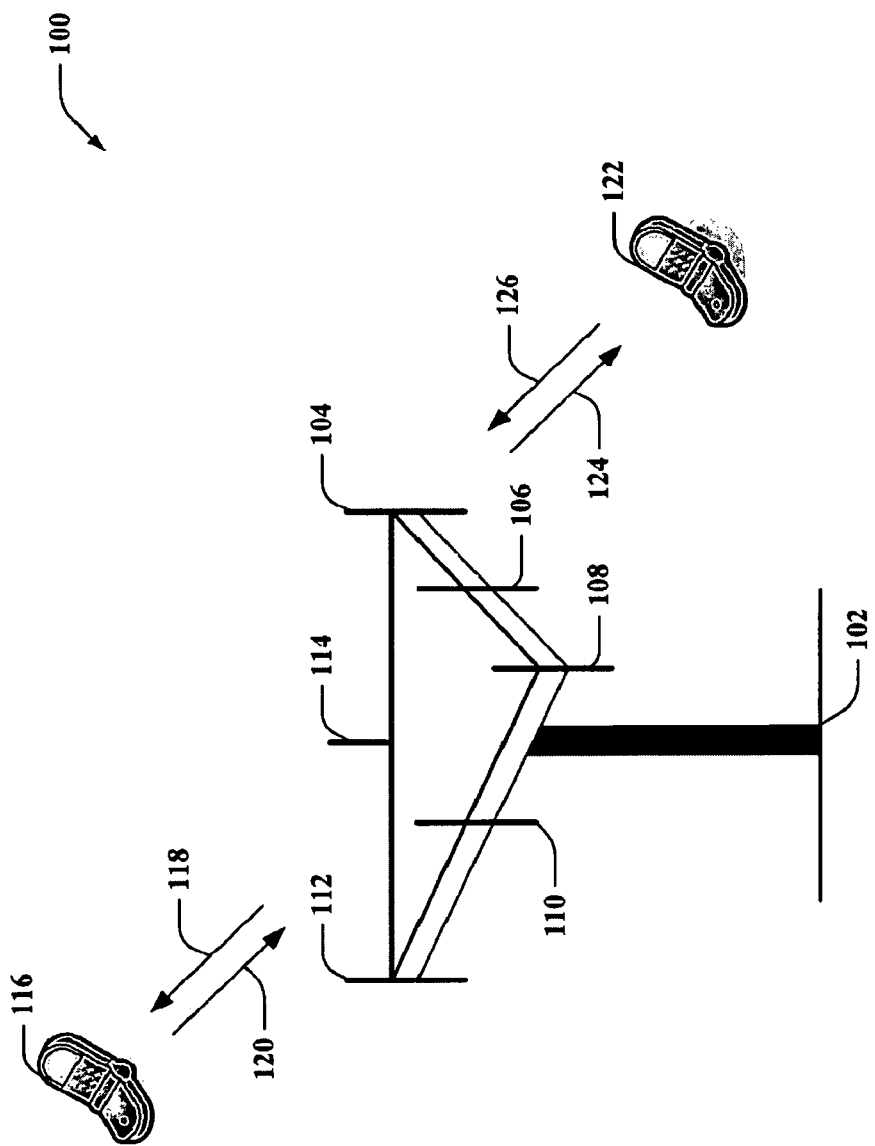
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in older to facilitate describing one or more embodiments.

As used in this application, the terms "component," "module," "system," and the like are intended to refer to a computer-related entity, either hardware, firmware, a combination of hardware and software, software, or software in execution. For example, a component can be, hut is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology as depicted.

According to an example, system 100 can be a multiple-input multiple-output (MIMO) communication system. Further, system 100 can utilize substantially any type of duplexing technique to divide communication channels (e.g., forward link, reverse link, . . . ) such as FDD, TDD, and the like. The communication channels can comprise one or more logical channels. Such logical channels can be provided for transmitting different types of data between the mobile devices 116 and 122 and the base station 102 (or from mobile device 116 to mobile device 122 in a peer-to-peer configuration, for example). Such channels can exist for transmitting control data, regular shared data (e.g., communication data), random access data, beacon/pilot data, broadcast data, and/or the like. For example, the base station 102 can establish a shared data channel utilized by the mobile devices 116 and 122 to access resources of the base station; additionally, the base station 102 can have a dedicated control channel for transmitting control information related to the shared data channel, for example.

Communications over the channels can be orthogonal (e.g., using OFDM, single carrier frequency domain multiplexing (SC-FDM), etc.) such that mobile devices 116 and 122 transmit at different times on a given channel to prevent collision; to facilitate orthogonal communicating, the mobile devices 116 and 122 can be given a timing advance with respect to transmitting on the channels. The timing advance can specify a waiting period before the given mobile device can communicate or the period during which the device is to communicate on the channel, etc. Additionally, data can be communicated with a cyclic prefix adjusting for error in timing of transmitting the data. For example, the cyclic prefix can be a portion of one or mope symbols transmitted on a channel that can be re-transmitted at the beginning or end of the symbol transmission in the event that a portion of the symbol is not received due to the timing error. For given channels, the cyclic prefix can vary to tolerate additional timing error (this can depend on the type, demand, and/or method of connection for the channel, for example). In one example, a channel utilized to acquire channel resources from a new device can have a larger cyclic prefix since the timing of the channel is not certain to the device. In prior systems, the random access channel (RACH) can have a larger cyclic prefix to allow devices to send connection or handover requests, for example.

In one example, the subject matter described herein can handover devices from one base station to another by utilizing the shared data channel of the base station. For example, mobile device 116 can desire handover from the base station 102 to a disparate base station (not shown). The base station 102 can communicate with the disparate base station over the shared data channel to request the handover acquiring uplink resources on the disparate base station 102 for the mobile device 116. When the mobile device 116 has a good signal from the disparate base station, the handover can occur, and the mobile device 116 can estimate timing for the disparate base station based at least in part on the difference between the downlink shared data channel of base station 102 and that of the disparate base station. In addition, the disparate base station can utilize a larger cyclic prefix in some time periods to facilitate more reliable handover due to the uncertainty in timing.

Figure 2:
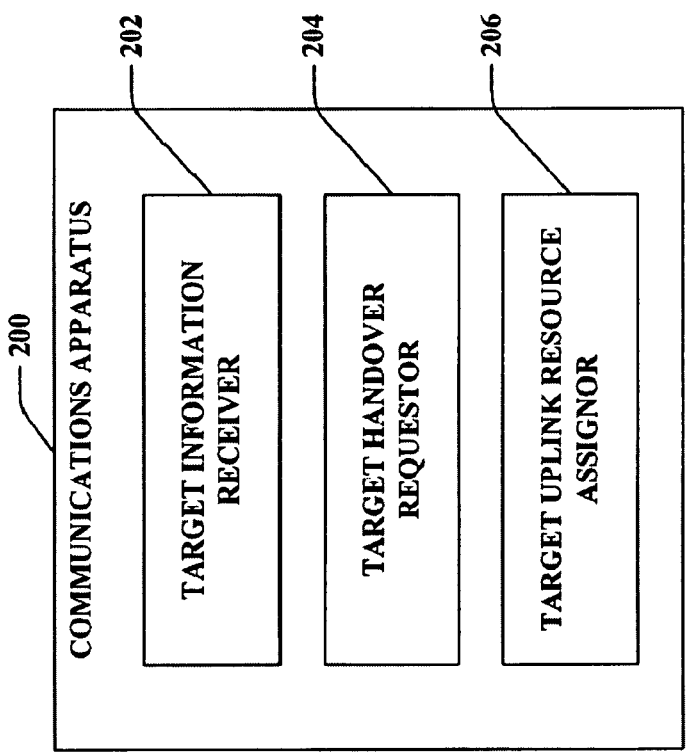
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. The communications apparatus 200 can include a target information receiver 202 that can acquire data regarding disparate communications apparatuses, a target handover requestor 204 that can request resources from a disparate communications apparatus to handover communication from a disparate device, and a target uplink resource assignor 206 that can provide uplink resources from the disparate communications apparatus to the disparate device.

According to an example, the target information receiver 202 can receive data regarding one or more disparate communications apparatuses. For example, the communications apparatus 200 and the disparate communications apparatuses can provide data access to mobile terminals such that the terminals can be handed over between the apparatuses. The handing over can be based at least in part on signal quality, services offered by the apparatuses, and/or the like, for example. The received information can be related to these aspects with respect to the one or more disparate communications apparatus and can be received by the target information receiver 202 from a mobile terminal (e.g., as a measurement report), the disparate apparatus, other network components, and/or the like; additionally, the information can be inferred or estimated based at least in part on previously received information, etc. Using the received information, the target handover requestor 204 can determine a disparate communications apparatus for handing over the mobile terminal.

For example, the received information can relate to a plurality of disparate communications apparatuses; the target handover requestor 204 can determine a most likely or desirable apparatus for handing over communications with a mobile terminal based on the information (e.g., signal quality, services offered, etc.). Once the disparate communications apparatus is determined, the target handover requestor 204 can request handover to the disparate apparatus on behalf of the mobile terminal and can receive uplink resources from the disparate apparatus. In one example, the target uplink resource assignor 206 can assign the received uplink resources to the mobile terminal allowing the terminal to communicate with the disparate apparatus without using a RACH. It is to be appreciated that the uplink resources can relate to a shared data channel, one or more control channels (e.g., a channel quality indicator (CQI) channel, R schedule request (SR) channel, etc.), and/or the like in an OFDM and/or SC-FDM configuration.

Figure 3:
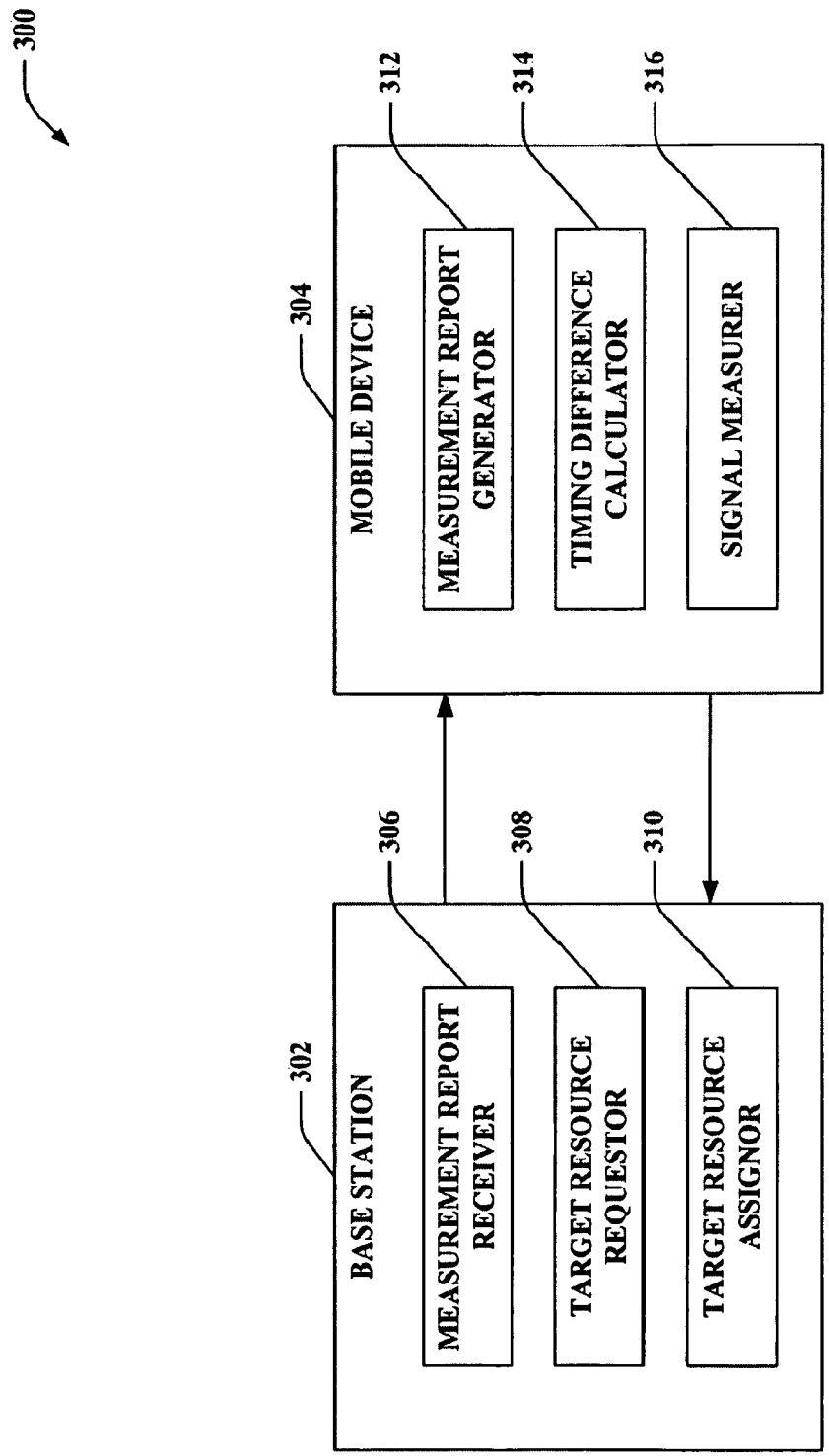
FIG. 3 is an illustration of an example wireless communications system that effectuates handing over communications using a shared data channel.

Now referring to FIG. 3, illustrated is a wireless communications system 300 that can utilize uplink shared data channels for initial access in mobile handover. The system 300 includes a base station 302 that can communicate with a mobile device 304 (and/or any number of disparate mobile devices (not shown)) to, facilitate wireless communication service. Base station 302 can transmit information to mobile device 304 over a forward link channel; further base station 302 can receive information from mobile device 304 over a reverse link or uplink channel. In addition, the mobile device 304 can desire to handover to a disparate base station. Moreover, system 300 can be a MIMO system. Additionally, the system 300 can operate in an OFDMA and/or SC-FDMA wireless network (such as 3GPP, 3GPP LTE, and the like, for example). Also, the components and functionalities shown and described below in the base station 302 can be present in the mobile device 304 as well and vice versa, in one example; the configuration depicted excludes these components for ease of explanation.

Base station 302 includes a measurement report receiver 306 that can acquire a measurement report related to the mobile device 304; the report can be sent from the mobile device 304, a disparate device (including one or more base stations), or a network component. The measurement report can be related to quality of surrounding base stations to the mobile device 304 (such as signal quality, resource quality, service quality, etc.). The base station 302 can additionally include a target resource requestor 308 that can request resources from one or more disparate base stations for the mobile device 304. For example, the resources can be requested based at least in part on the measurement report; for example, resources can be requested from a likely or desirable candidate base station for handover in view of other available candidates. The base station 302 can further include a target resource assignor 310 that can provide the requested resources from the candidate base station to the mobile device 304. In this regard, the shared data channel of the disparate base station can be utilized to request resources therefrom rather than requiring the RACH to be used.

Mobile device 304 includes a measurement report generator 312 that can create a measurement report comprising information regarding surrounding base stations. For example, the report can include information regarding signal quality with respect to the base stations, desired services offered by the base station, protocols utilized by the base station, a preference measurement for the base stations with respect to the mobile device 304, and/or the like. The mobile device 304 can additionally include a timing difference calculator 314 that can determine a timing advance difference to utilize in communicating with disparate base stations. Furthermore, the mobile device 304 can include a signal measurer 316 that can measure signals of disparate base stations to determine an appropriate time for handing over communications from one base station to the next.

According to an example, the base station 302 can provide communications resources to the mobile device 304. Handover can be desired for the mobile device 304; this can be indicated from the base station 302, mobile device 304, a disparate base station or device, a disparate network component, and/or the like. For example, the mobile device 304 can be moving throughout an area and can detect a decrease in signal-to-noise ratio or a better signal from a disparate base station, for example. In another example, positioning services (e.g., GPS) can be utilized to determine if there is a better base station for the mobile device 304. Moreover, the mobile device 304 can request services unavailable from the base station 302 in one example. In any case, the handover can be desired causing the measurement report generator 312 to create a measurement report regarding surrounding or available base stations. The report can be as specified above (e.g., comprising signal information, resource information, service information, and/or the like).

The mobile device 304 can transmit the report to the measurement report receiver 306, which can utilize the report to evaluate the base stations for handover. In one example, this can include analyzing a base station specified by the mobile device 304. Once a disparate base station is chosen, whether by determining a best candidate from the measurement report or explicitly receiving direction by the mobile device 304, the target resource requestor 308 can request uplink resources from the disparate base station on behalf of the mobile device 304. It is to be appreciated that additional information regarding the mobile device 304 can be sent to the disparate base station as well. The base station 302 can receive uplink resources (e.g., one or more shared data communications channels) for the mobile device 304 and can utilize the target resource assignor 310 to provide the resources to the mobile device 304. The resources can relate to a dynamic single instance assignment for a given time period or a persistent; assuagement for periodic resources over a number of time instances. Additionally, the disparate base station can utilize the base station 302 to communicate other information to the mobile device 304 in one example.

Upon receiving the uplink resources for the disparate base station, the mobile device 304 can leverage the timing difference calculator 314 to determine difference between timing of the uplink resources for the base station 302 and the disparate base station. In one example, the mobile device can attain timing information via synchronization channels for the base stations. Using the signal measurer 316, the mobile device 304 can determine when it is in range to handover communication to the disparate base station; for example, handover can occur when the signal reaches a given threshold, in one example. Upon handing over communication, the mobile device 304 can utilize the calculated timing difference in transmitting data to the disparate base station to attain a general level of synchronization.

In one example, the disparate base station can utilize different sized cyclic prefixes in given time intervals to compensate for greater error in the timing of the transmission from the mobile device 304; this can be a network specification, specific to the base station, etc. It is to be appreciated that information regarding the cyclic prefix size can be transmitted to devices, such as the mobile device 3304, in a variety of ways including broadcasting such (e.g., on a broadcast channel). For example, the information can be formatted such as a list of frames or transmission time intervals (TTI) having short and/or long cyclic prefixes. In another example, the information can comprise an offset from a current or initial frame to the first long cyclic prefix TTI. Additionally, the disparate base station can dynamically configure the cyclic prefix specifically for the handover. Using this information, the mobile device 304 can handover to the disparate base station and transmit initial data during a long cyclic prefix TTI to attain a greater possibility of successful communication (and therefore a successful handover). Once the initial communication is transmitted, the mobile device 304 can receive more accurate synchronization information from the disparate base station, for example. It is to be appreciated that additional measures can be taken to ensure reliable initial communication such as communicating using hybrid automatic repeat-request (HARQ) transmission for the initial (and/or subsequent) handover communication. In this regard, a RACH is not required for handover mitigating over utilization thereof and delay associated therewith.

Figure 4:
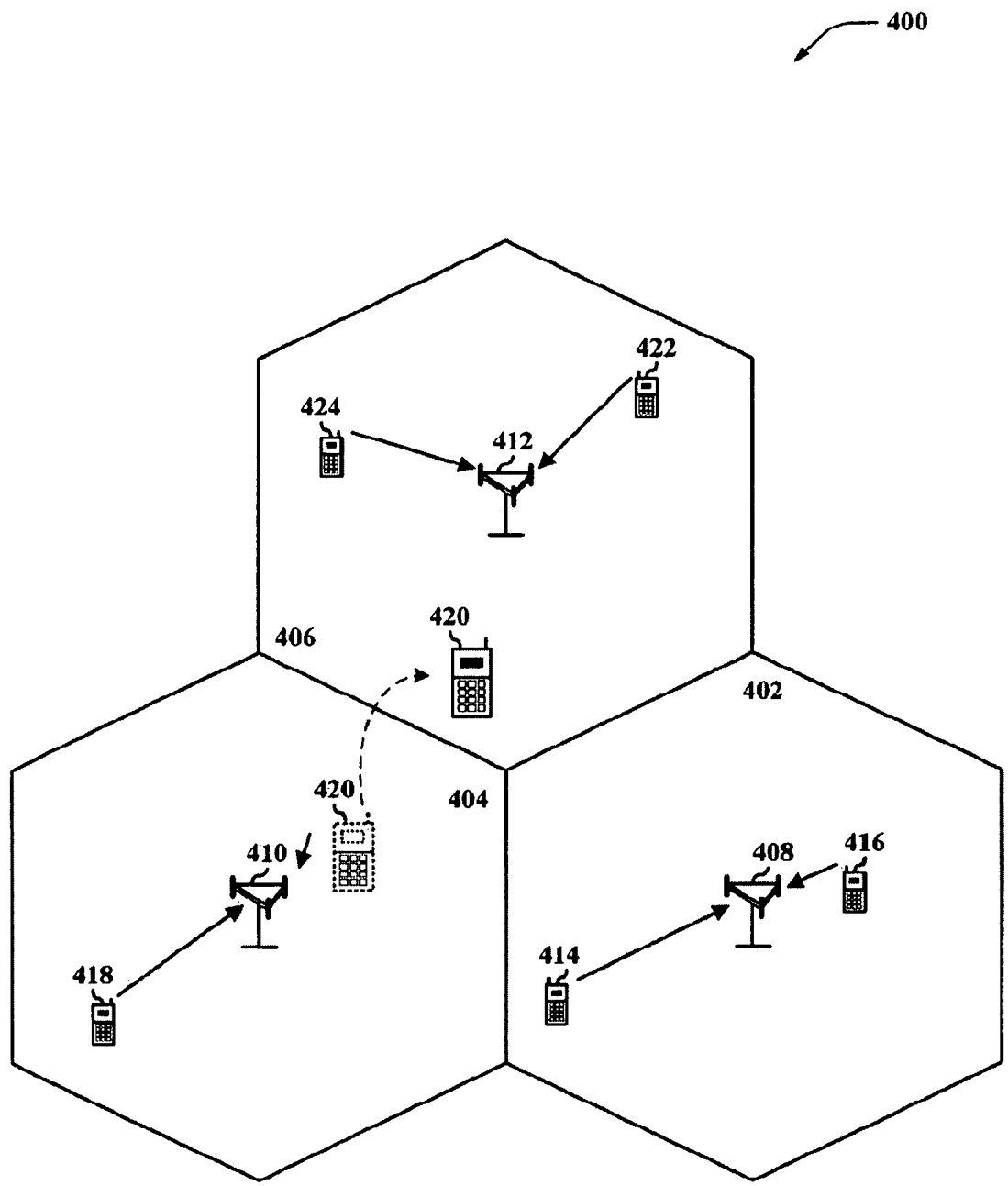
FIG. 4 is an illustration of an example wireless communications network with mobile devices moving between sectors.

Now referring to FIG. 4, an example multiple-access wireless communications network 400 is shown. The network 400 includes multiple communications cells 402, 404, and 406 each having a respective base station 408, 410, and 412 with multiple antennae to support communications from a variety of devices. For example, devices 414 and 416 in cell sector 402 can communicate with base station 408, devices 418 and 420 initially in sector 404 can communicate with base station 410, and devices 422 and 424 in sector 406 can communicate with base station 412. In this example, device 420 can be moving throughout the network 400. As the device 420 moves away from the base station 410, the signal can fade and resources required to communicate with the base station 410 can increase. As the device 420 moves toward base station 412, at some point it may be advantageous to communicate instead with base station 412 in sector 406; thus, the device 420 can be handed over from sector 404 to sector 406 (and hence from base station 410 to base station 412).

As described supra, the mobile device 420 can transmit: a measurement report to the base station 410; for example, the report can comprise information regarding base stations 408 and 412 and the signal qualities associated therewith. The base station 410 can determine that base station 412 would be a better base station for the mobile device 420 to handover to. Thus, the base station 410 can transmit a handover request, or a disparate request comprising information regarding the mobile device 420, to the base station 412. Using this information, for example, the base station 412 can assign uplink shared data channel resources to the mobile device 420 via base station 410. The mobile device 420 can utilize this information, in one example, to determine timing/synchronization data with respect to communicating with base station 412 over the shared data channel. In another example, a CQI channel can be assigned to the mobile device 420 and utilized as well if it is assigned by the base station 412 at the time.

When the mobile device 420 is sufficiently in range of the base station 412 to initiate the handover (e.g., when channel measurements meet given thresholds), it can transmit data to the base station 412 using the timing/synchronization data to discern a timing advance for the transmission. For example, the mobile device 420 can compute the difference between communicating with the base station 410 and the base station 412 by measuring synchronization channels thereof. Though the timing may not be precise, it can be generally close enough such that technologies can be utilized to appropriately decode the transmission. In one example, the base station 412 can utilize TTIs with extended cyclic prefixes, and the mobile device 420 can leverage these TTIs to transmit initial handover information.

However, extending cyclic prefixes can have an adverse affect on throughput; thus, only certain TTIs can have the extended cyclic prefixes in one example, and this information can be known by the mobile device 402 (e.g., by broadcasting information regarding the TTIs such as specific times of extended cyclic prefixes, a pattern with or without an offset, and/or specific occurrence). In addition, TTIs having extended cyclic prefix can be specially (e.g., dynamically) implemented upon learning of the handover, in one example. Also, HARQ transmission can be used to improve the reliability of the initial (and/or subsequent) handover communications. It is to be appreciated that following initial communications, more precise timing information can be received and utilized by the mobile device 420 to ensure reliable subsequent communication with the base station 412. In this regard, handover is effectuated without using a RACH.

Figure 5:
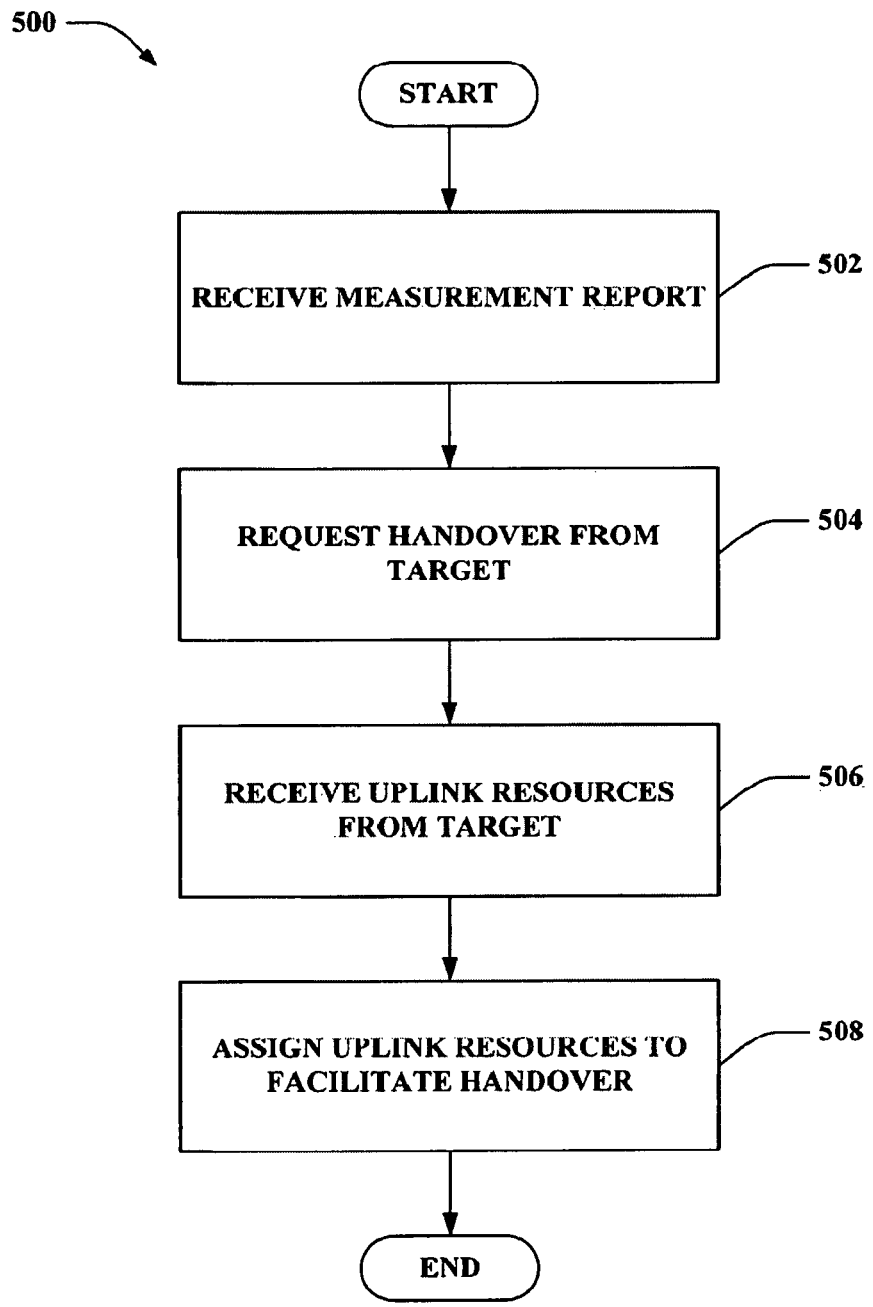
FIG. 5 is an illustration of an example methodology that facilitates requesting uplink communications resources on behalf of the mobile device.
Figure 6:
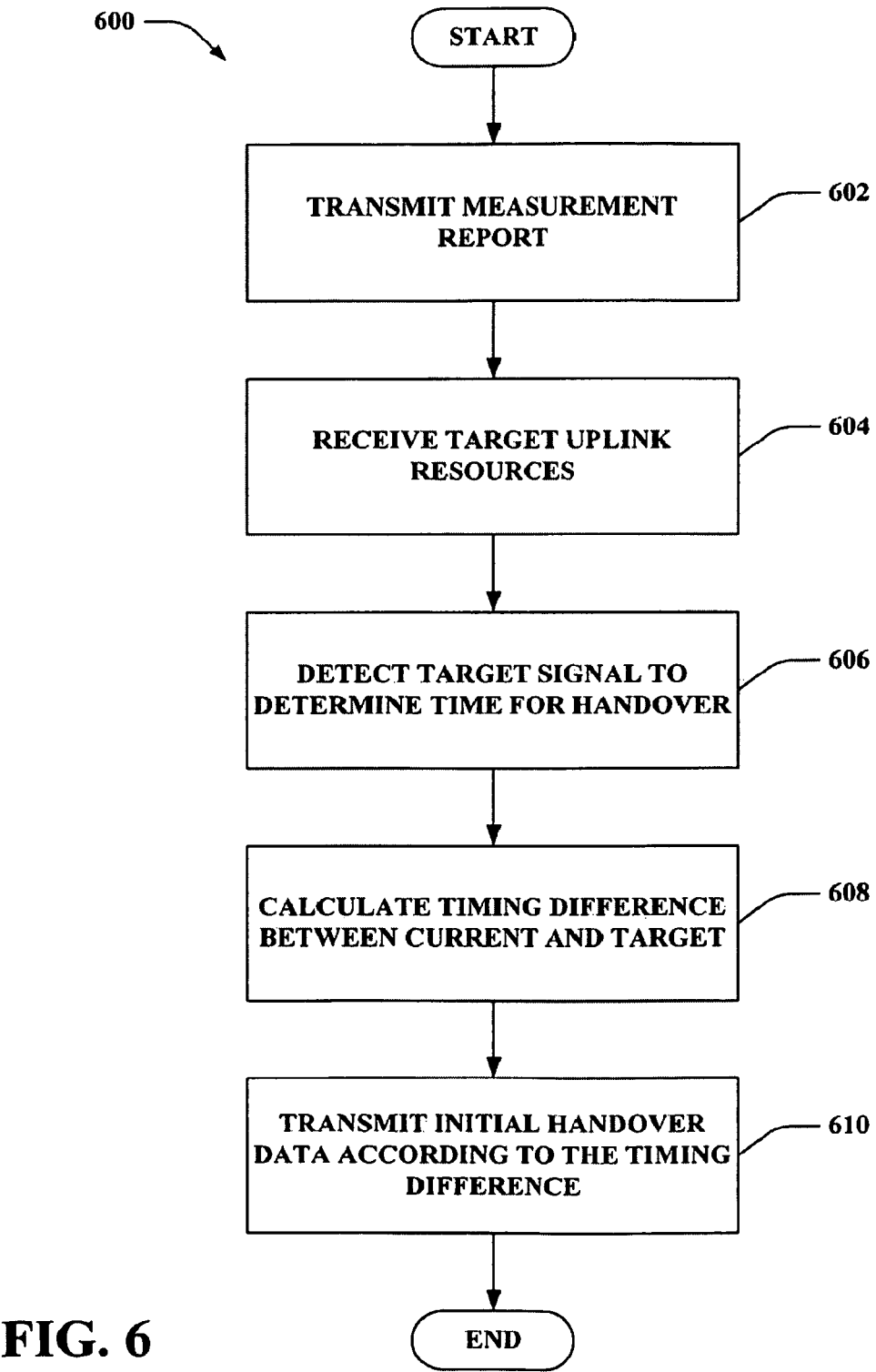
FIG. 6 is an illustration of an example methodology that facilitates over communications between base stations.

Referring to FIGS. 5-6, methodologies relating to handing over communications using a shared data channel of the target (e.g., instead of a RACH) are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a methodology 500 that facilitates requesting and assigning uplink resources during handover of communications. At 502, a measurement report is received comprising information regarding one or more communications targets and metrics related thereto. For example, the measurement report can comprise signal quality and/or strength of a target access point for connection therewith. Additionally, the measurement report can comprise other data as described including offered services, protocols, and the like. At 504, handover is requested from the target. The handover request can be transmitted on behalf of a device being handed over. In this regard, the request can comprise target specific information including resource demand, protocol, etc. This information can come from the device and/or can be generated by the current access point (e.g., information regarding usage statistics, activity level, and/or the like).

At 506, uplink resources are received from the target. The resources can include a shared data channel in one example. The shared data channel can be orthogonal such that communications over the channel cannot interfere in time; rather each device can transmit at a different time. This can be accomplished, in one example, using OFDM, SC-FDM, and/or similar technologies to orthogonalize the channel. Additionally, if available, control channel resources can be received as well to allow specification of CQI, for example. At 508, uplink resources can be assigned to facilitate handover. For example, the resources can be assigned to a device to be handed over such that the device can communicate with the target (e.g., through the current access point).

Now referring to FIG. 6, a methodology 600 that facilitates handing over communications between a source and target access point using a shared data channel is illustrated. At 602, a measurement report is transmitted; the report can be as described above including signal measurements, resource availability, accessible services, accessible protocols, and/or the like. The report can be generated by a mobile device, for example. At 604, target uplink resources can be received; for example, the resources can relate to a portion of a shared data channel on which a device can communicate. Additionally, the resources can include a control channel, if available, to allow transmitting CQI for the shared data channel. At 606, the target signal is detected to determine a time for handover. For example, once the signal reaches a threshold, handover can occur as the target becomes a better service provider.

Additionally, the handover can be based on factors other than signal quality, in one example, including availability of a service requested by the mobile device that may not be available from the current access point or service provider. At 608, a timing difference can be calculated between the current and the target (e.g., access points). This can be accomplished in a number of ways including evaluating a synchronization channel related to each. Using this information with the uplink resource information received, timing for the channel can be estimated. Using the timing difference, the initial handover data can be transmitted at 610. For example, the timing can be generally correct, and measures can be taken at both ends to account for discrepancy (such as extended cyclic prefixes and HARQ transmissions as described previously). Once the initial handover data is communicated, more precise timing can be established.

It will be appreciated that, in accordance with one or more aspects described herein, inferences can be made regarding handing over communications from a source base station to a target base station for a mobile device as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to all example, one or more methods presented above can include making inferences pertaining to creating the measurement report, determining a best match for the mobile device from the measurement report, etc. Inferences can also be made pertaining to calculating the timing difference between a source and target base station, as well as determining a TTI using extended cyclic prefixes to strategically transmit initial handover data within, and/or the like.

Figure 7:
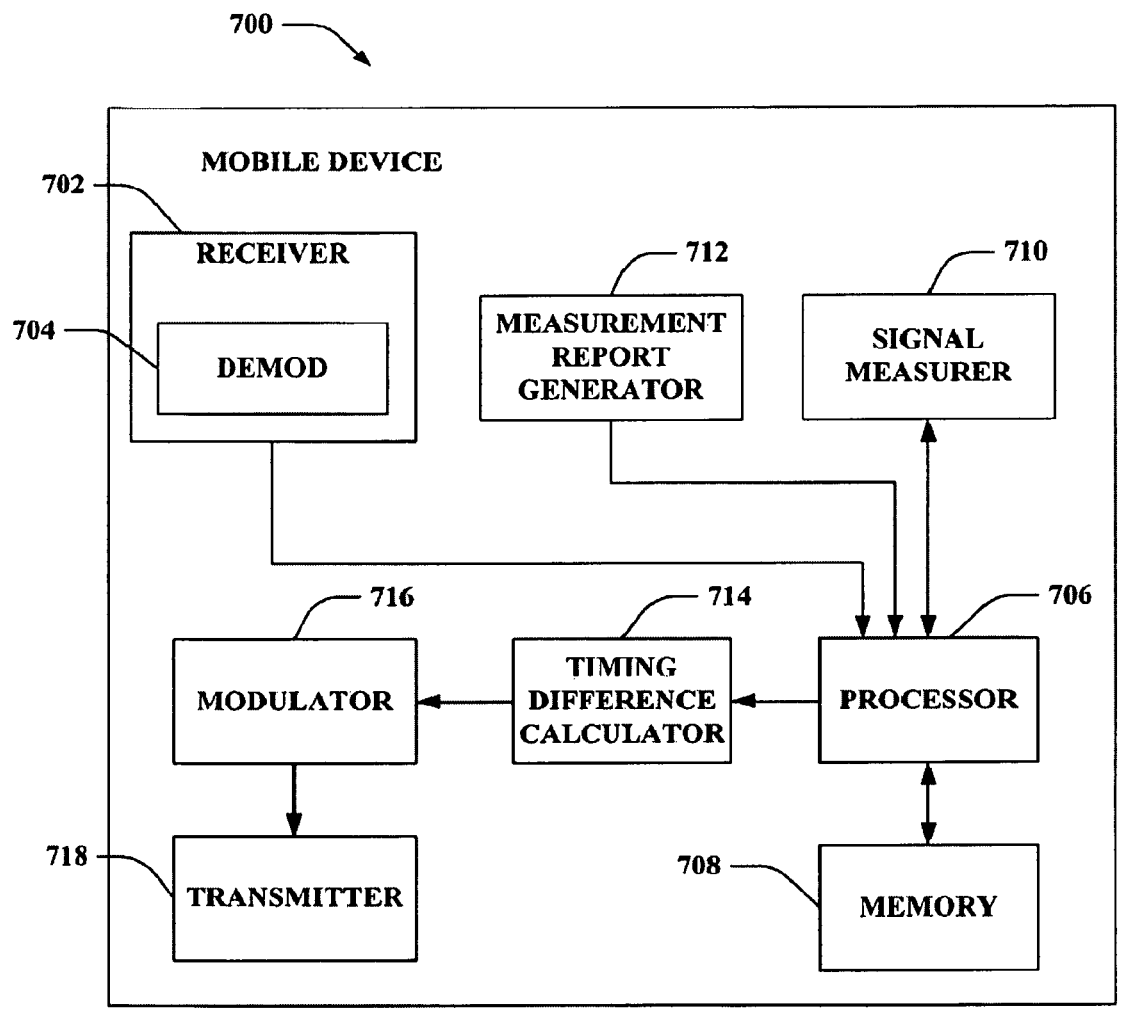
FIG. 7 is an illustration of an example mobile device that facilitates over communications in a wireless network.

FIG. 7 is an illustration of a mobile device 700 that facilitates handing over communications utilizing a shared data channel of a target to transmit initial handover data. Mobile device 700 comprises a receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 718, a processor that controls one or mole components of mobile device 700, and/or a processor that both analyzes information received by receiver 702, generates information for transmission by transmitter 718, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 706 can further be operatively coupled to signal measurer 710 that can measure signals with respect to surrounding base stations and a measurement report generator 712 that can create a report comprising signal measurements (or other data as described supra) related to the surrounding base stations. For example, the mobile device 700 can be moving around a service area and coming to a point where communicating with the current base station is not as desirable as communicating with a disparate base station, due to signal strength, available resources, available service, and/or the like. The measurement report generator 712 can create a report related to the surrounding base stations, which can include signals strengths measured by the signal measurer 710, for example. The report can be transmitted to a base station that can request handover with a disparate base station from the report and can receive resources from disparate the base station for uplink communication.

The mobile device 700 can receive the resources and communicate with the disparate base station through the current base station, in one example. The signal measurer 710 can be utilized to determine when to handover to the disparate base station (e.g., when the signal reaches a given threshold), in one example. Upon such a determination, the timing difference calculator 714 can be utilized to determine a generally correct timing for the target base station based at least in part on a difference in time between the source and target base stations (e.g., by evaluating their respective synchronization channels) and can utilize that time; difference to estimate timing for transmitting on the uplink resources. It is to be appreciated that, as described previously, measures can be taken at both ends to strengthen reliability of the initial communication so more precise timing information can eventually be received. Mobile device 700 still further comprises a modulator 716 and transmitter 718 that respectively modulate and transmit signals to, for instance, a base station, another mobile device, etc. Although depicted as being separate from the processor 706, it is to be appreciated that the signal measurer 710, measurement report generator 712, timing difference calculator 714, demodulator 704, and/or modulator 716 can be part of the processor 706 or multiple processors (not shown).

Figure 8:
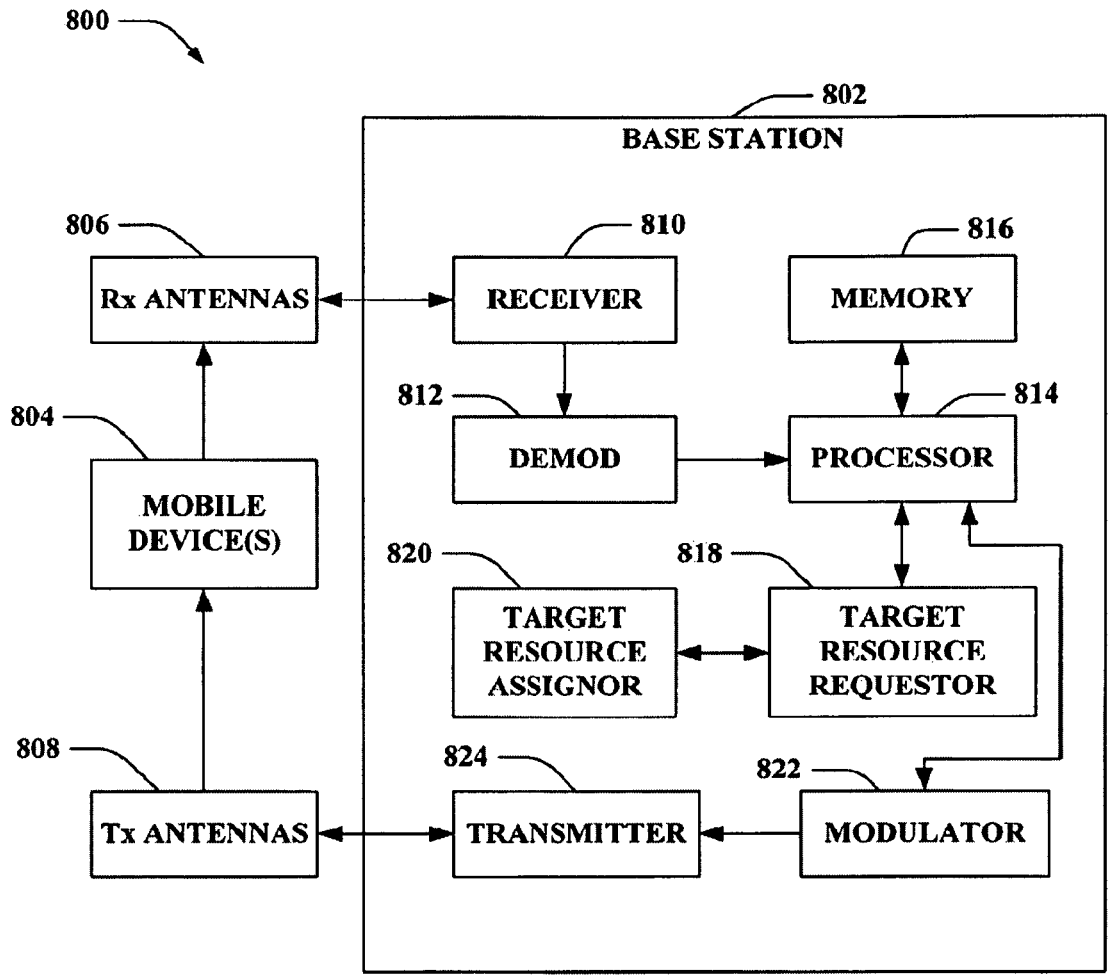
FIG. 8 is an illustration of an example system that facilitates requesting communications resources for handing over communications.

FIG. 8 is an illustration of a system 800 that facilitates requesting handover from a target base station on behalf of a mobile device. The system 800 comprises a base station 802 (e.g., access point, . . . ) with a receiver 910 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a target resource requestor 818 that can request uplink resources (such as a shared data channel) to be utilized in handing over communications from a mobile device 804 and a target resource assignor 820 that can assign the resources to the mobile device 804.

For instance, one or more mobile devices 804 can be in range for handover. This information can be received in a plurality of ways including receiving a report from the mobile device comprising measurement information regarding disparate base stations (as described above). Upon receiving notification of potential handover, the target resource requester 818 can communicate with one or more of the potential target base stations to acquire uplink communication resources on behalf of the mobile device 804. It is to be appreciated that information regarding the mobile device 804 can be transmitted in the request as described. Upon receiving the resources, which can comprise a shared data channel and/or control channel (e.g., for transmitting CQI), the target resource assignor 820 can assign the resources to the mobile device 804, and the mobile device 804 can handover communications when ready in one example. Furthermore, although depicted as being separate from the processor 814, it is to be appreciated that the target resource requester 818, target resource assignor 920, demodulator 812, and/or modulator 822 can be part of the processor 814 or multiple processors (not shown).

Figure 9:
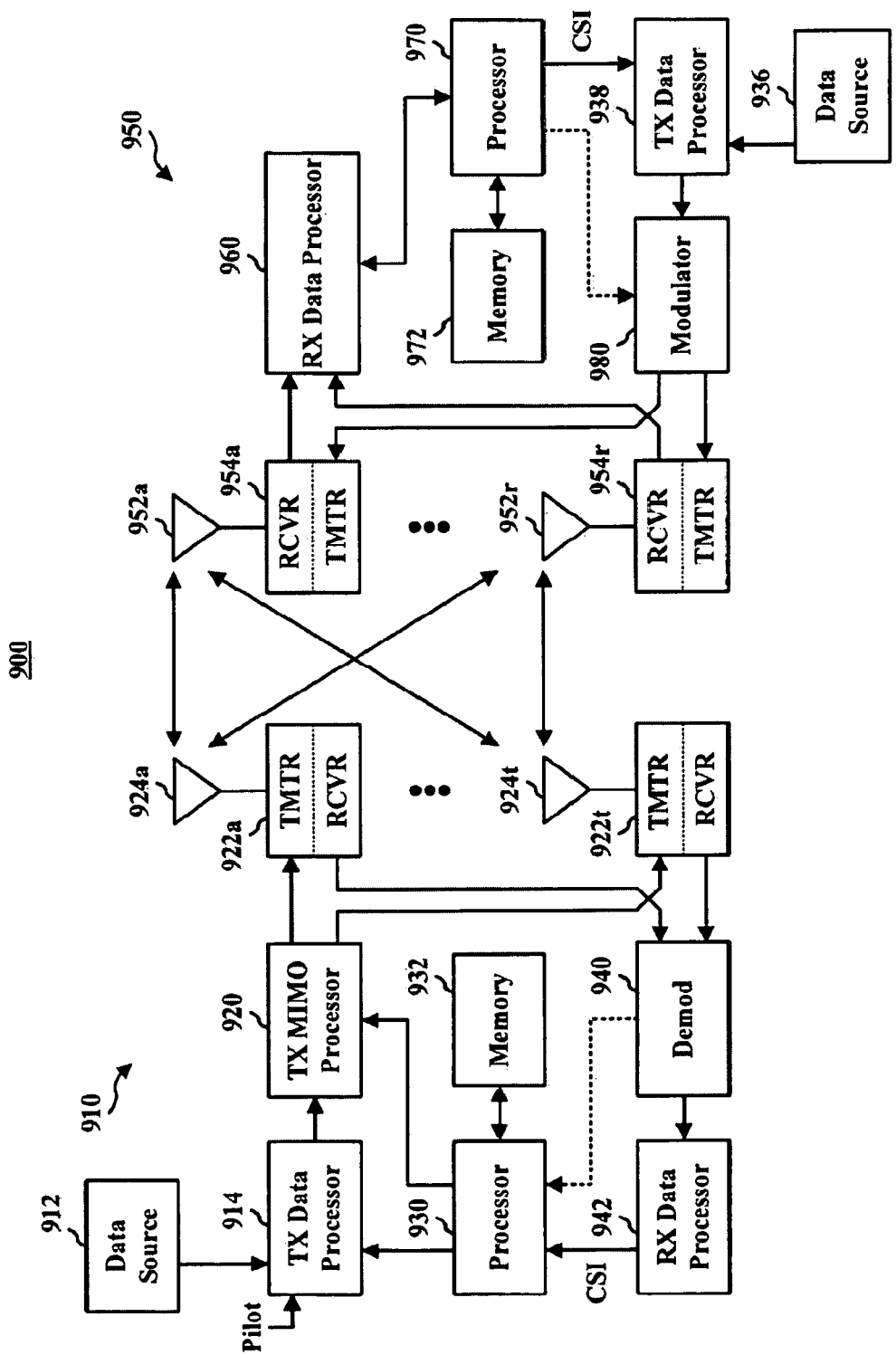
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 14 and 78) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which precoding matrix to utilize discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
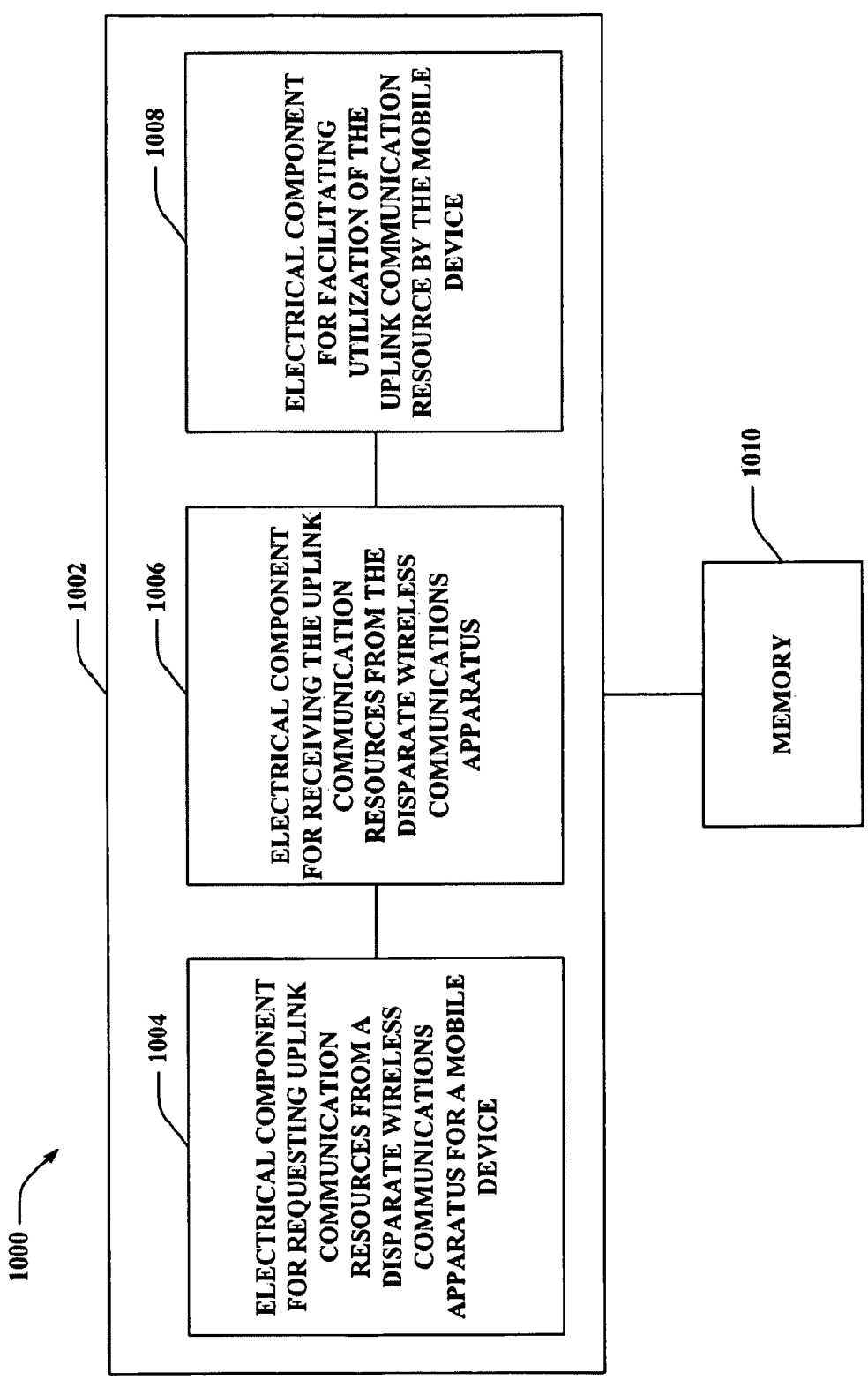
FIG. 10 is an illustration of an example system that requests communications resources for handing over mobile device communications.

With reference to FIG. 10, illustrated is a system 1000 that facilitates handing over mobile communications in a wireless network without using a RACH. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for requesting uplink communication resources from a disparate wireless communications apparatus for a mobile device 1004. For example, information regarding the mobile device can be transmitted with the request. Additionally, the request can be made based on a measurement report related to the mobile device comprising information regarding surrounding base stations (such as signal strength or other factors listed above). Further, logical grouping 1002 can comprise an electrical component for receiving the uplink communication resources from the disparate wireless communications apparatus 1006. For example, the resources can relate to a shared data channel that is utilized to transmit communication data to the disparate wireless communication apparatus; the shared data channel can be time orthogonal such that the resources assign a transmission time interval that can be utilized to transmit data specific to the requesting device. Moreover, logical grouping 1002 can comprise an electrical component for facilitating utilization of the uplink communication resource by the mobile device 1008. Thus, the mobile device can communicate with the disparate wireless communications apparatus through the assigned resources. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

Figure 11:
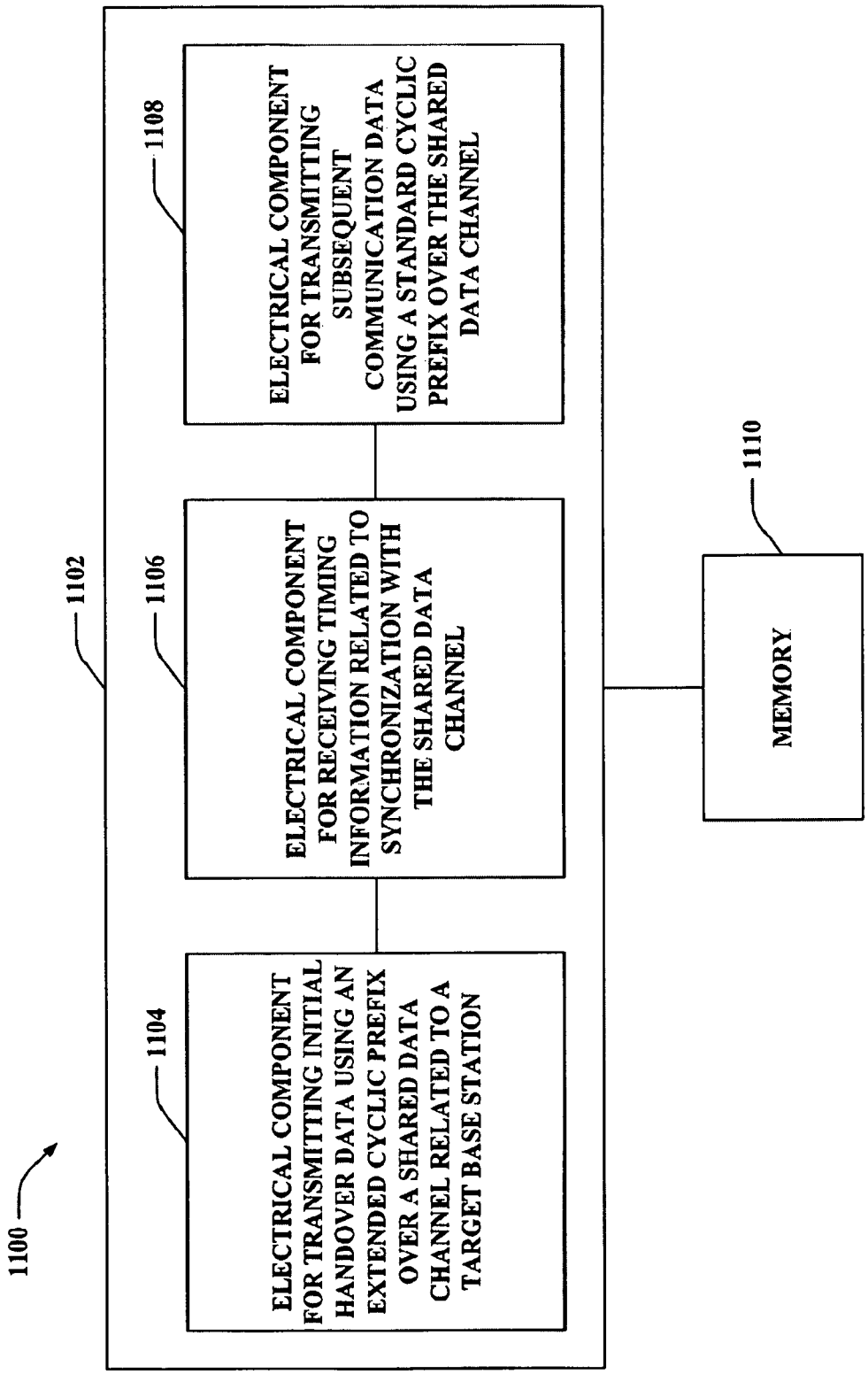
FIG. 11 is an illustration of an example system that hands over communication between a source and target base station.

Turning to FIG. 11, illustrated is a system 1100 that hands over mobile communications from a source base station to a target base station using a shared data channel. System 1100 can reside within a base station, mobile device, etc., for instance. As depicted, system 1100 includes functional blocks that can represent functions implemented by a processor, software, or combination thereof (e.g., firmware). System 1100 includes a logical grouping 1102 of electrical components that facilitate handing over communications. Logical grouping 1102 can include an electrical component for transmitting initial handover data using an extended cyclic prefix over a shared data channel related to a target base station 1104. For example, the target base station can allow transmissions using extended cyclic prefixes in certain TTIs as described to facilitate more reliable communication of the initial handover data as the mobile device may not have precise timing information related to the target base station. Moreover, logical grouping 1102 can include an electrical component for receiving timing information related to synchronization with the shared data channel 1106. In this regard, the mobile device can receive more precise information regarding timing for transmitting on the communication channel for subsequent communication. Further, logical grouping 1102 can comprise an electrical component for transmitting subsequent communication data using a standard cyclic prefix over the shared data channel 1108. Additionally, system 1100 can include a memory 1110 that retains instructions for executing functions associated with electrical components 1104, 1106, and 1108. While shown as being external to memory 1110, it is to be understood that electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for handing over communications in a wireless network, comprising:
    providing, by a first base station, wireless network communication services to at least one mobile device in a sector;
    requesting, by the first base station, shared data uplink communication channel resources from a second base station of a disparate sector on behalf of the mobile device to facilitate handing over the mobile device to the second base station without using random access channel resources;
    assigning, by the first base station, the shared data uplink communication channel resources from the second base station of the disparate sector to the mobile device such that the mobile device can communicate with the second base station without using the random access channel resources; and
    enforcing extended cyclic prefixes on communications channels during given transmission time intervals to facilitate communicating with handed over devices having general timing information.

2. The method of claim 1, wherein the shared data uplink communications channel resources are assigned to the mobile device for a single instance dynamic grant assignment or for a persistent assignment.

3. The method of claim 2, wherein a shared data communication channel is an orthogonal frequency division multiplexing (OFDM) or single carrier-frequency division multiplexing (SC-FDM) logical channel that allows time orthogonal communication with a plurality of mobile devices.

4. The method of claim 1, further including receiving uplink control channel resources for reporting uplink control data related to the shared uplink data communication channel resources.

5. The method of claim 1, further including receiving a measurement report related to a plurality of base stations, wherein the second base station of the disparate sector is selected for requesting the shared data uplink communication channel resources based at least in part on the measurement report.

6. The method of claim 5, wherein the second base station of the disparate sector is selected based on a highest signal quality with respect to the mobile device.

7. The method of claim 1, further including selecting the cyclic prefix transmission time intervals based on handover information received for a disparate mobile device.

8. The method of claim 1, further including transmitting data regarding the mobile device in the request for the shared data uplink communication channel resources.

9. A wireless communications apparatus, comprising:
    at least one processor configured to request uplink communications resources from a base station of a disparate sector based at least in part on a measurement report received from a mobile device to facilitate handing over the mobile device to the base station of the disparate sector without using random access channel resources; and
    a memory coupled to the at least one processor,
    wherein the at least one processor is further configured to allow extended cyclic prefixes for mobile devices transmitting in one or more transmission time intervals.

10. The wireless communications apparatus of claim 9, wherein the at least one processor is further configured to receive the requested uplink communications resources from the base station for the mobile device.

11. The wireless communications apparatus of claim 10, wherein the at least one processor is further configured to assign the uplink communications resources to the mobile device.

12. The wireless communications apparatus of claim 9, wherein the measurement report relates to signal strength of one or more base stations in range of the mobile device.

13. The wireless communications apparatus of claim 12, wherein the at least one processor is further configured to select the base station for handing over communication with the mobile device based at least in part on the signal strength.

14. The wireless communications apparatus of claim 9, wherein the at least one processor is further configured to receive control channel resources from the base station for reporting control data related to the uplink communications resources.

15. The wireless communications apparatus of claim 9, wherein the uplink communications resources relate to one or more time frames of a shared data channel on which the mobile device can transmit data to the base station.

16. A wireless communications apparatus that requests uplink resources for handing over mobile device communications, comprising:
    means for requesting uplink communication resources from a disparate wireless communications apparatus for a mobile device;
    means for receiving the uplink communication resources from the disparate wireless communications apparatus;
    means for facilitating utilization of the uplink communication resources by the mobile device such that the mobile device can communicate with the disparate wireless communications apparatus without using random access channel resources; and
    means for allowing extended cyclic prefixes for mobile devices transmitting in one or more transmission time intervals.

17. The wireless communications apparatus of claim 16, further including means for transmitting mobile device information with the request for uplink communication resources.

18. The wireless communications apparatus of claim 16, further including means for receiving a measurement report from the mobile device regarding one or more disparate wireless communications apparatuses.

19. The wireless communications apparatus of claim 18, further including means for selecting the disparate wireless communications apparatus based at least in part on the measurement report.

20. The wireless communications apparatus of claim 16, further including means for receiving resources related to a control channel on which the mobile device transmits control data regarding the uplink communication resources.

21. A computer program product, comprising:
a non-transitory computer-readable medium comprising:
code for causing at least one computer to provide wireless network communication services to a mobile device in a sector;
code for causing the at least one computer to request shared data uplink communication channel resources from at least one base station of a disparate sector on behalf of the mobile device to facilitate handing over the mobile device to the at least one base station without using random access channel resources; and
code for causing the at least one computer to assign the shared data uplink communication channel resources from the at least one base station of the disparate sector to the mobile device; and
code for causing the at least one computer to enforce extended cyclic prefixes on communications channels during given transmission time intervals to facilitate communicating with handed over devices having general timing information.

22. The computer program product of claim 21, wherein the uplink communications channel resources relate to a shared data communication channel of the at least one base station of the disparate sector.

23. A wireless communication apparatus, comprising:
a processor configured to:
request uplink communication resources from a disparate wireless communications apparatus for a mobile device;
receive the uplink communication resources from the disparate wireless communications apparatus;
facilitate utilization of the uplink communication resource by the mobile device to the disparate wireless communications apparatus without using random access channel resources; and
allow extended cyclic prefixes for mobile devices transmitting in one or more transmission time intervals; and
a memory coupled to the processor.

24. The wireless communications apparatus of claim 23, wherein the processor is further configured to transmit mobile device information with the request for uplink communication resources.

25. The wireless communications apparatus of claim 23, wherein the processor is further configured to receive a measurement report from the mobile device regarding one or more disparate wireless communications apparatuses.

26. The wireless communications apparatus of claim 25, wherein the processor is further configured to select the disparate wireless communications apparatus based at least in part on the measurement report.

27. The wireless communications apparatus of claim 23, wherein the processor is further configured to receive resources related to a control channel on which the mobile device transmits control data regarding the uplink communication resources.

28. The computer program product of claim 21, wherein the shared data uplink communications channel resources are assigned to the mobile device for a single instance dynamic grant assignment or for a persistent assignment.

29. The computer program product of claim 21, wherein the computer-readable medium further includes code for causing the at least one computer to receive uplink control channel resources for reporting uplink control data related to the shared data uplink communication channel resources.

30. The computer program product of claim 21, wherein the computer-readable medium further includes code for causing the at least one computer to receive a measurement report related to a plurality of base stations, wherein the at least one base station of the disparate sector is selected for requesting the shared data uplink communication channel resources based at least in part on the measurement report.

31. The computer program product of claim 30, wherein the at least one base station of the disparate sector is selected based on a highest signal quality with respect to the mobile device.

32. The computer program product of claim 21, wherein the computer-readable medium further includes code for causing the at least one computer to select the cyclic prefix transmission time intervals based on handover information received for a disparate mobile device.

33. The computer program product of claim 21, wherein the computer-readable medium further includes code for causing the at least one computer to transmit data regarding the mobile device in the request for the shared data uplink communication channel resources.

* * * * *